US005326211A

United States Patent [19]

Critchley

[11] Patent Number: 5,326,211

[45] Date of Patent: Jul. 5, 1994

[54] AIRLOCK SYSTEM

[75] Inventor: Richard J. Critchley, Near Chorley, England

[73] Assignee: British Nuclear Fuels plc, Warrington, England

[21] Appl. No.: 724,192

[22] Filed: Jul. 1, 1991

[30] Foreign Application Priority Data

Jul. 13, 1990 [GB] United Kingdom ................. 9015469

[51] Int. Cl.[5] .............................................. B65G 49/00

[52] U.S. Cl. .................................. 414/217; 118/719; 414/146; 49/63; 49/116; 49/366; 49/327; 454/187; 454/195

[58] Field of Search ............... 414/217, 222, 157, 150, 414/146, 160, 187; 204/298.25; 118/719; 52/204; 49/36, 116-121, 125, 371, 366-369, 404, 38, 485, 168, 207, 327, 61, 63, 130, 142; 454/187, 195

[56] References Cited

U.S. PATENT DOCUMENTS

| | | | |
|---|---|---|---|
| 3,568,632 | 3/1971 | Cawthon | 118/719 |
| 4,242,836 | 1/1981 | Anderson | 49/63 |
| 4,830,233 | 5/1989 | Thelen et al. | 414/221 X |
| 4,897,963 | 2/1990 | Reboul et al. | 414/146 X |

FOREIGN PATENT DOCUMENTS

| | | | |
|---|---|---|---|
| 282224 | 12/1986 | Japan | 414/217 |

*Primary Examiner*—Frank E. Werner

*Attorney, Agent, or Firm*—William R. Hinds

[57] ABSTRACT

An air lock system for the transfer of large containers into a containment comprises a set of horizontally and vertically slidable doors adapted to define a variable opening for the passage of containers. The set of doors cooperate with a further preceding set, which can be a single slidable door, to form an airlock. Ventilation means in the containment provide an inward air flow through the opening into the containment.

4 Claims, 1 Drawing Sheet

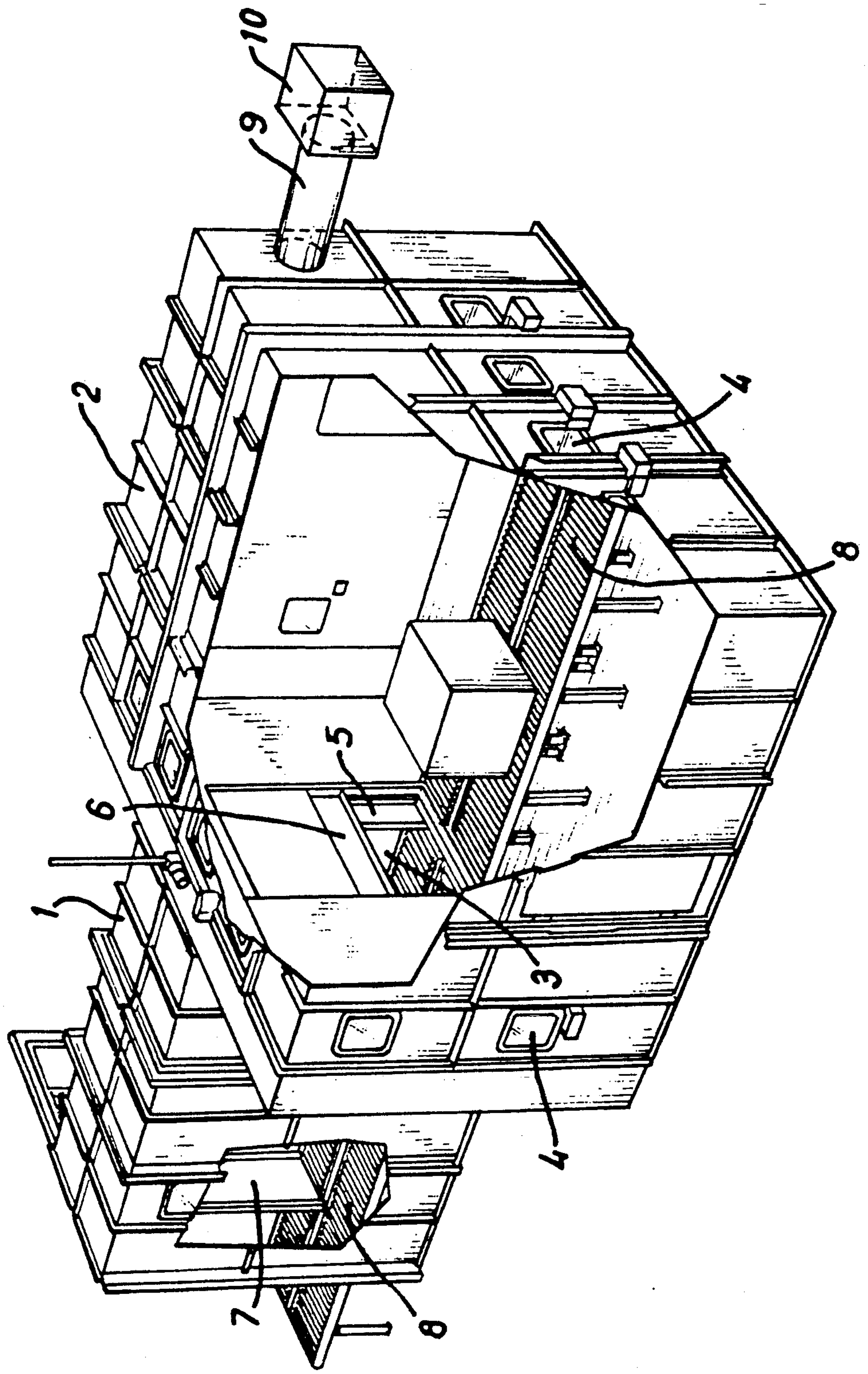
10
9
2
4
8
5
6
1
3
4
7
8

AIRLOCK SYSTEM

The present invention concerns an airlock system for the transfer of items into a containment. In particular, the invention concerns a system whereby large containers can be transferred into a containment without escape of atmosphere from the containment.

Many large items of radioactive waste are not suitable for packaging into standard sized waste containers without significant size reduction. Provision of equipment to enable in-situ size reduction at each facility would prove prohibitively expensive. A more preferable option is to transfer the large waste items in temporary containers to a centralised facility for size reduction.

According to aspects of the present invention an airlock system for the transfer of containers into a containment includes a set of vertically and horizontally movable doors defining a variably sized opening adaptable to the dimensions of the containers being transferred and means for providing an inward air flow into the containment through the opening.

Conveniently, the set comprises a pair of horizontally movable doors at opposite sides of the opening and a vertically movable door. The airlock can be completed by a further door set, which can be a single slidable door, preceding the first mentioned set.

The opening defined by the set of doors can be adjusted to the dimensions of the individual containers being transferred into the containment. This, together with the inward air flow prevents escape of atmosphere from the containment through the opening during transfer which is required when the containers contain radioactive materials which can cause contamination of the interior of the containment.

The present invention thus provides an airlock system comprising, in combination, means defining a containment constructed and arranged for receiving radioactive waste containers, means defining an opening through which the radioactive waste containers can be transferred into the containment, conveyor means to transfer radioactive waste containers through the opening into the containment from outside the containment, means forming a vertically oriented, vertically slidable door and at least one vertically oriented, horizontally slidable door, the doors being in contiguous relationship and selectively and variably movable across the opening in relatively transverse directions to vary the size of the opening by varying relatively transverse dimensions thereof to adapt the opening dimensions to dimensions of radioactive waste containers being transferred into the containment, and ventilation means for providing an inward airflow into the containment through the opening to prevent escape of atmosphere from the containment through the opening during transfer of the radioactive waste container through the opening.

The invention will be described further, by way of example, with reference to the accompanying schematic drawing of an airlock system, portions being cut-away to show the interior.

The system comprises an airlock 1 and a breakdown cell or containment 2 intercommunicating through an opening 3 controlled by a set of sliding doors. The construction comprises steel panels sealed by cellular rubber strips between each flange. Viewing windows 4 are located at strategic positions around the cell.

The set of sliding doors comprises a pair of horizontally movable doors 5 at opposite side of the opening and a single vertically movable door 6.

Alternatively, the sliding door set comprises two pairs of horizontally movable doors 5 with a single vertically movable door 6 positioned between the two pairs of horizontally movable doors. The doors 5 and 6 can be power driven, for example by electrical or pneumatic means. This arrangement allows the entrance or opening 3 to the cell 2 to be formed to suit the size and shape of an item being transferred into the cell.

A single electrically or pneumatically operable door 7 can be arranged at the entrance to the airlock 1. All doors and inflatable door seals are capable of remote operation. Remotely operated roller conveyors 8 transfer items through the airlock into the cell or containment 2.

A ventilation system such as an extract duct 9 in a wall of the cell facing the opening 3 and having a fan 10 provides the required airflows. The ventilation system will also include filters and the like in the extract duct. Basic operation consists of conveying an item through the profile doors under a predetermined set of conditions (speed, airflow rate etc.) and characterising the resultant air flow patterns.

In order to characterise the operation of such a large facility, use was made of a range of test techniques as outlines below:

Flow Visualisation

Introduction of high density smoke and neutrally buoyant helium-filled bubbles enabled the visualisation of airflow patterns within the facility. In particular the smoke was used to study bulk flow patterns whereas the bubbles mimicked the paths followed by airborne particulate. Woolen tufts were used to indicate airflow directions adjacent to the surfaces. Results were recorded on video tape and still photographs.

Anemometry

Unidirectional hot-wire anemometers were used to monitor air velocities and ventilation extract rates.

Tracer Gas

Sulphur Hexafluoride ($SF_6$), a non-active, non-toxic gas, was used to simulate airborne contamination. Detection was by five infra-red gas analysers, the outputs from which were linked to a data logger. $SF_6$ was released at a controlled rate downstream of the profile door and any variation in upstream concentration during item transfer recorded. This technique, in addition to detecting any egress, indicated when such an event occurred, thereby enabling the 'fault' condition to be closely defined.

Particulate Tracer

Mechanical transfer of contamination during transfer operations was studied using a clearly visible simulant, namely finely divided Potassium Permanganate, which stained when surfaces were sprayed with water.

Computational Fluid Dynamics

This is a mathematical modelling technique that uses a specific programme or code for the computer to carry out numerous iterations of simultaneous equations and then predict airflow patterns for the particular facility design specified.

Structure of Tests

Initial commissioning and calibration work as well as designing a suitable $SF_6$ injection and sampling system in the vicinity of the profiling doors.

Identify transfer procedures for the safe and efficient movement of the container via the airlock doors.

Complete a full matrix of tests on a standard 1 $m^3$container, using one door arrangement, to provide an initial data base of video material and an understanding of the effects of three basic parameters, ie. container position with respect to the doors, annular gap and annular velocity.

An assessment of the mechanical transfer of "contamination" from surfaces exposed to the cell towards the upstream "clean" side during container transfer procedures.

Static tests on the significance of various parameters including container position, size, attitude and streamlining; annular gap, velocity and cross draughts; profiling door arrangement and edge design.

Specific tests to provide comparative data for the Computational Fluid Dynamics model of predicted airflows.

Results

When the video recordings are compared in their entirety, the effects on the airflows of each of the variable parameters can be evaluated to enable optimum settings to be identified. The significant parameters are container position and annular gap followed by annular velocity. No "contaminated" breakdown cell air, simulated by neutrally buoyant soap bubbles and smoke, was seen to diffuse or reverse flow into the upstream airlock chamber during any of the facility flow settings tested.

A single pair of horizontally sliding doors and one vertically sliding door has been found to adequately contain the atmosphere within cell. As example only, this can be achieved for a plain-sided, 1 $m^3$ container transfer, under various flow conditions but preferably a 1 meter per second annular velocity and 0.1 meter annular gap.

I claim:

1. An airlock system comprising, in combination, means defining a containment constructed and arranged for receiving radioactive waste containers, means defining an opening through which the radioactive waste containers can be transferred into said containment, conveyor means to transfer radioactive waste containers through said opening into said containment from outside said containment, means forming a vertically oriented, vertically slidable door and at least one vertically oriented, horizontally slidable door, said doors being in contiguous relationship and selectively and variably movable across said opening in relatively transverse directions to vary a size of said opening by varying relatively transverse dimensions thereof to adapt the opening dimensions to dimensions of radioactive waste containers being transferred into said containment, and ventilation means for providing an inward airflow into the containment through the opening to prevent escape of atmosphere from the containment through the opening during transfer of the radioactive waste container through the opening.

2. An airlock system as claimed in claim 1 wherein said at least one vertically oriented slidable door comprises a pair of vertically oriented, horizontally slidable doors at respectively opposite sides of said opening.

3. An airlock system as claimed in claim 1 further comprising means defining an airlock passage outside of said containment and communicating with said opening such that containers are transferred first into said airlock passage and then into said containment, and a further door in said airlock passage spaced from the first-mentioned doors, through which further door containers are transferred into said airlock passage.

4. An airlock system as claimed in claim 1 wherein said vertically movable door variably defines an upper extent of said opening.

* * * * *